(12) United States Patent
Pirila et al.

(10) Patent No.: US 7,539,526 B2
(45) Date of Patent: May 26, 2009

(54) FOLDABLE KEYBOARD FOR AN ELECTRONIC DEVICE

(75) Inventors: Jouko Pirila, Turku (FI); Juuso Heiskanen, Turku (FI)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 11/206,643

(22) Filed: Aug. 17, 2005

(65) Prior Publication Data

US 2007/0041773 A1 Feb. 22, 2007

(51) Int. Cl.
*H04M 1/00* (2006.01)

(52) U.S. Cl. .............. 455/575.3; 455/575.1; 455/575.4; 455/90.3

(58) Field of Classification Search .............. 455/575.1, 455/575.3, 575.4, 90.3
See application file for complete search history.

(56) References Cited

U.S. PATENT DOCUMENTS

| | | | |
|---|---|---|---|
| 6,580,932 B1 | 6/2003 | Finke-Anlauff | ............ 455/575 |
| 6,798,649 B1 * | 9/2004 | Olodort et al. | .............. 361/683 |
| 6,983,175 B2 * | 1/2006 | Kwon | ...................... 455/575.1 |
| 2005/0026658 A1 * | 2/2005 | Soejima | ................... 455/575.1 |

\* cited by examiner

*Primary Examiner*—Alexander Eisen
*Assistant Examiner*—Wayne Cai

(74) *Attorney, Agent, or Firm*—Ware, Fressola, Van Der Sluys & Adolphson LLP

(57) ABSTRACT

An electronic device with a full function foldable keyboard is presented and includes first, second and third body elements in an overlapping stacked alignment with one another when the device is in a closed position and a display screen constructed in at least one of said first, second and third body elements. The first and second body elements are arranged for pivotal movement with respect to one another about a first pivot axis and the third body element is arranged for pivotal movement with respect to one of the first and second body elements about a second pivot axis passing through one of the first and second body elements. A function keyboard constructed in two portions, each of which has an array of keys consistent with a selected function wherein the function keyboard is exposed for operative use when the device is in a first open position in which the first, second and third body elements are in a non-overlapping alignment with one another and are located on opposite sides of the display screen. The third body element has first and second major face surfaces oppositely disposed from one another and a keypad having an array of keys arranged consistent with a selected function is constructed in the first surface whereby the keypad and the display screen are exposed for operative usage when the device is in a second open position. A pair of spaced apart pivot bars nests the first body element and one end of each is attached to one end of the third body element for movement therewith. The second pivot axis passes through the pivot bars and the first body element. The third body element and the spaced apart pivot bars are arranged for pivotal movement with respect to the first and second body elements when the third body element is rotated between the second open position and the first open position. Several embodiments and an associated computer program are also presented.

20 Claims, 8 Drawing Sheets

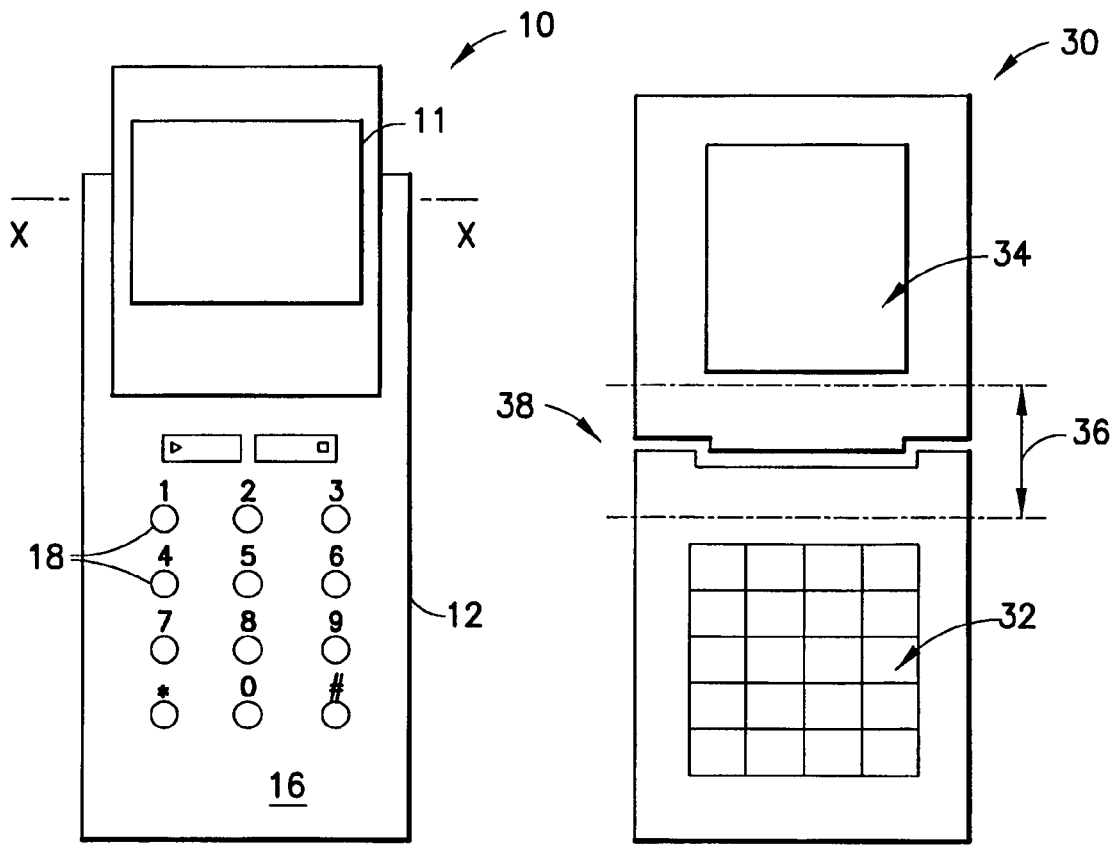
FIG.1
PRIOR ART
FIG.3
PRIOR ART
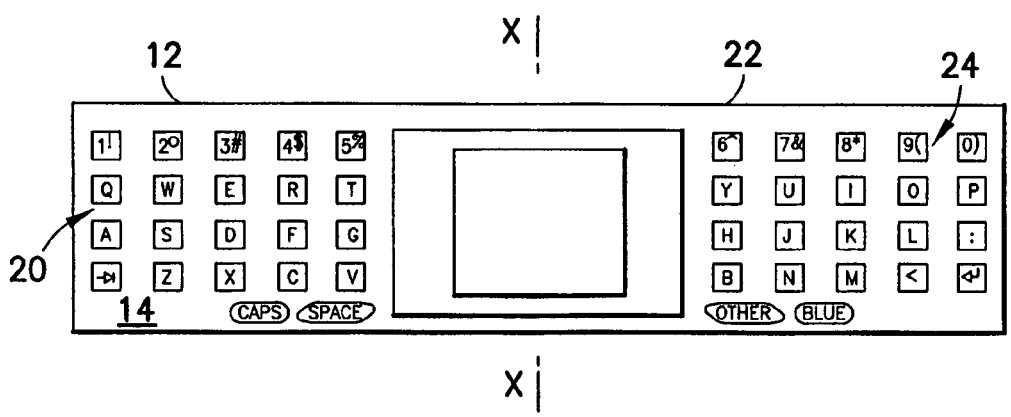
FIG.2
PRIOR ART

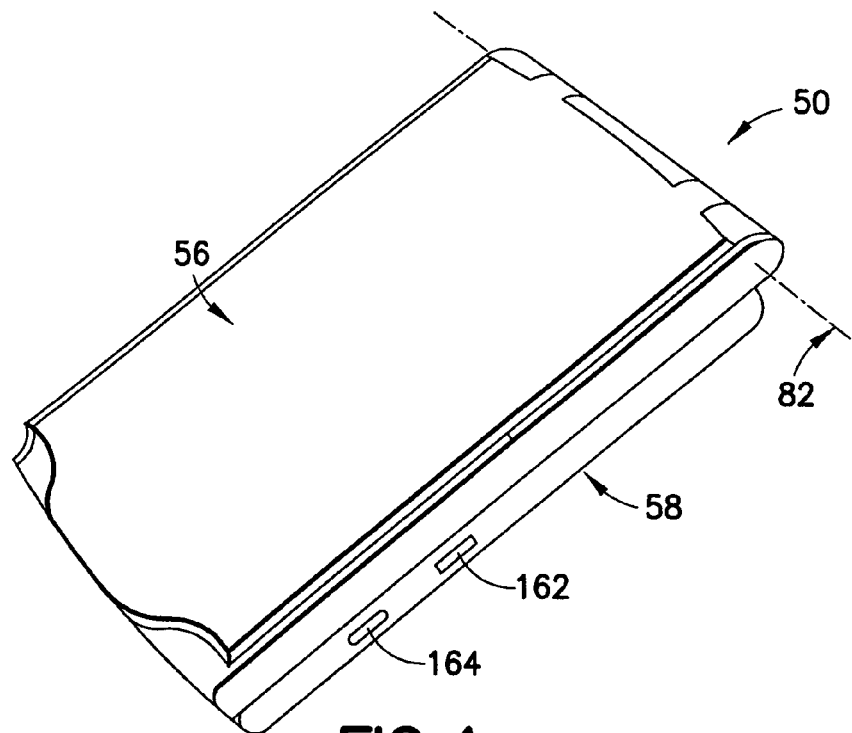
FIG.4
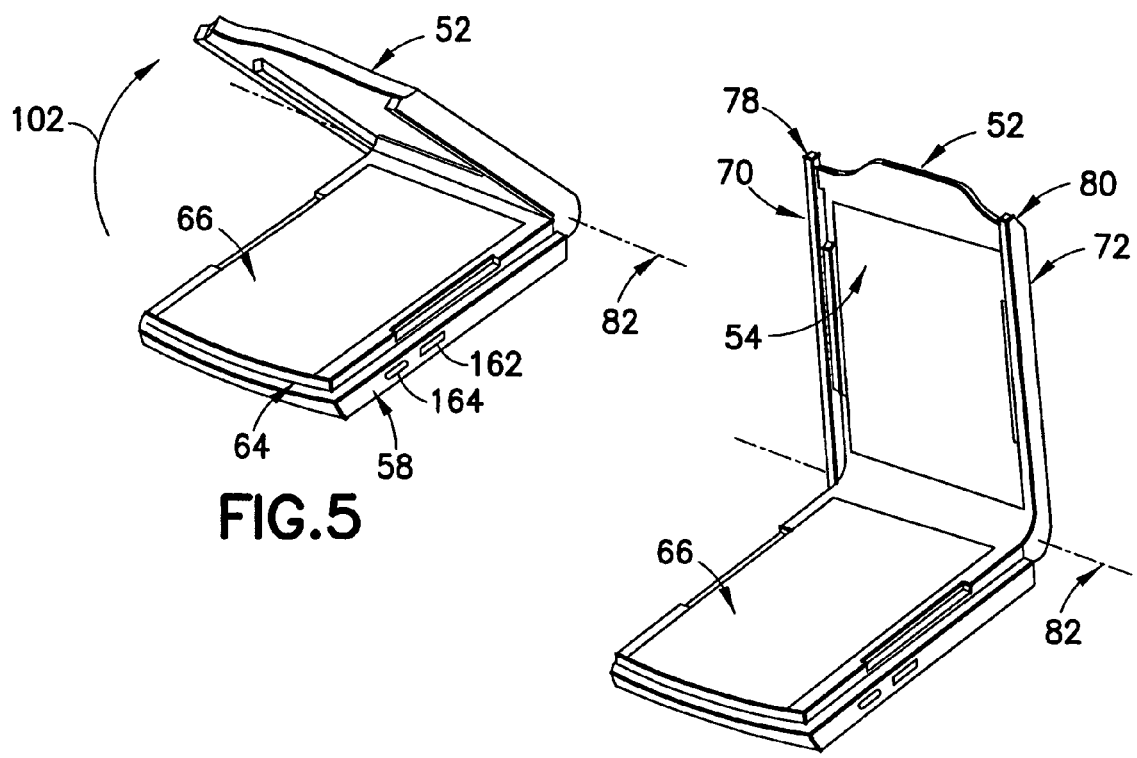
FIG.5
FIG.6

FOLDABLE KEYBOARD FOR AN ELECTRONIC DEVICE

TECHNICAL FIELD

The present invention relates generally to electronic devices and more particularly with electronic devices operating in multiple applications and having keyboard functionality. The present invention more specifically deals with a full function foldable keyboard for an electronic device.

BACKGROUND OF THE INVENTION

Portable electronic devices particularly mobile telephones and similar communication devices have rapidly expanded in use and function as users have demanded increasing functionality. It is common to see mobile telephones that provide Global Computer Network access, messaging, personal information management, personal digital assistant functionality, music, facsimile, gaming, in addition to telephone communication. More complex keyboards have been provided to be compatible with the more complex applications that are found in such devices. One such prior art full function keyboard arrangement is disclosed in U.S. Pat. No. 6,580,932, assigned to the same assignee as the present invention and is shown in FIGS. 1 and 2. A foldable keyboard is provided in a mobile phone 10 having a display screen 11 wherein a panel 12 has an inner face 14 and an outer face 16 and rotates about the pivot axis X-X between two operative positions. The outer face 16 carries a communication keypad 18 and the inner face 14 carries a portion 20 of the number of keys of the full function keyboard and which keys are exposed for access and usage when the panel 12 is rotated into an open position as shown in FIG. 2. The panel 12 is in an overlapping position with a further fixed panel 22 that carries the remaining portion 24 of the number of keys of the keyboard. The keys on the fixed panel 22 are exposed for access and usage when the rotated panel 12 is in the open position. Although such devices are capable of providing more complex applications the arrangement limits the size of the keys and the key array of the full function keyboard and the size of the display screen.

It would be desirable therefore to provide a key array for a full function keyboard and a larger viewing area screen display in an electronic device while maintaining the compact size demanded for the electronic device.

Further, prior art foldable or hinged electronic devices such as a mobile phone 30 illustrated in FIG. 3 also limit the size of a keyboard 32 and display screen 34 to achieve a compact device that accommodates the unused surface area 36 in the region of the hinge 38. Although such hinged arrangements for electronic devices reduce the size of the electronic device compared to non-foldable electronic devices, the area 36 in the region of the hinge 38 is otherwise wasted and unused.

It would be desirable therefore to utilize the otherwise unusable surface area in a hinged electronic device to provide a foldable keyboard and a larger size screen display demanded for the electronic device.

It is an object of the present invention to provide a simple and inexpensive means of providing a full function keyboard and a larger viewing area screen display size to accommodate the more complex applications of an electronic device while maintaining a compact form factor for the electronic device.

SUMMARY OF THE INVENTION

In accordance with a broad aspect of the invention, an electronic device is presented and comprises first, second and third body elements in an overlapping stacked alignment with one another when the device is in a closed position. A display screen is constructed in at least one of the first, second and third body elements. The first and second body elements are arranged for pivotal movement with respect to one another about a first pivot axis and the third body element is arranged for pivotal movement with respect to one of the first and second body elements about a second pivot axis passing through one of the first and second body elements. A function keyboard is constructed in two portions, each of which have an array of keys consistent with a selected function. The function keyboard is exposed for operative use when the device is in a first open position, whereby the first, second and third body elements are in a non-overlapping alignment with one another and are located on opposite sides of the display screen.

In a further aspect of the invention, the third body element has first and second major face surfaces oppositely disposed from one another. A keypad has an array of keys arranged consistent with a selected function and is constructed in the first surface whereby the keypad and the display screen are exposed for operative usage when the device is in a second open position. The first body element is nested between a pair of spaced apart pivot bars. One end of each of the spaced apart pivot bars is attached to one end of the third body element for movement therewith. The second pivot axis passes through the pivot bars and the first body element whereby the third body element and the spaced apart pivot bars are arranged for pivotal movement with respect to the first and second body elements when the third body element is rotated between the second open position and the first open position. In this aspect of the invention, the screen display is constructed in the first body element and the keypad is a communication keypad and the electronic device is a mobile terminal.

The electronic device may be configured with the screen display constructed in the first body element and a first portion of the function keyboard constructed in the second body element and a second portion of the function keyboard constructed in the third body element. Further, the function keyboard is a QWERTY keyboard and a first portion of the keys are carried by the second body element and the remaining keys are carried by the third body element.

In a yet further aspect of the invention, the display screen is constructed in the third body element and a first portion of the function keyboard is constructed in the second body element and a second portion of the function keyboard is constructed in the first body element. One end of the third body element is arranged for sliding linear movement with respect to one of the first and second body elements and the end opposite the one end is arranged for pivotal movement about the second pivot axis with respect to the other of the first and second body elements when the first and second body elements are rotated about the first pivot axis between the closed position and the first open position.

A torque hinge pivotally connects the third body element to the other of the first and second body elements. One end of the third body element is arranged for sliding linear movement in and along complementary slide rails located in the marginal side regions of the one of the first and second body elements whereby the one end is slidingly retained by grooves in the slide rails.

A hinge connects the first and second body elements together for relative pivotal movement about the first pivot axis whereby the display screen obscures the hinge when the device is in the first open position.

The electronic device may include a power button for powering the electronic device on and off when the device is in a closed position and may include a volume control button for selectable adjustment of the volume when the device is in a closed position.

In a still further aspect of the invention, a computer program is carried on a storage medium and is executable by a processor in the electronic device for automatically changing, if required, the orientation of information shown on a display of the electronic device when the electronic device is used in its first open operative position and in its second open operative position wherein the electronic device has a first body element, a second body element and a third body element which has first and second major face surfaces oppositely disposed from one another. The first major face surface is constructed with a keypad having an array of keys arranged consistent with a selected function. The first, second and third body elements are arranged in an overlapping stacked alignment with one another when the device is in a closed position. A display screen is constructed in at least one of the first, second and third body elements and the first and second body elements are arranged for pivotal movement with respect to one another about a first pivot axis. The third body element is arranged for pivotal movement with respect to one of the first and second body elements about a second pivot axis passing through one of the first and second body elements. A function keyboard is constructed in two portions, each having an array of keys consistent with a selected function wherein the function keyboard is exposed for operative use when the device is in a first open position in which the first, second and third body elements are in a non-overlapping alignment with one another and are located on opposite sides of the display screen. The keypad and the display screen are exposed for operative usage and the second and third body elements are in overlapping alignment with one another in a second open position.

BRIEF DESCRIPTION OF THE DRAWINGS

Other objects, features and advantages of the present invention will become readily apparent from the following written description taken with the figures wherein:

FIG. 1 is a schematic diagram of a prior art electronic device with a foldable keyboard in a closed position.

FIG. 2 is a schematic diagram of the prior art electronic device of FIG. 1 in an open position showing the portions of the foldable keyboard revealed for access.

FIG. 3 is a schematic diagram of a prior art electronic hinged device in an open position showing the unused surface area of the two-hinged parts in the region of the hinge.

FIG. 4 is a schematic perspective view of an electronic device having a function keyboard embodying the present invention showing the electronic device in a closed position.

FIG. 5 is a schematic perspective view of the electronic device of FIG. 4 showing the cover rotated open approximately 45° from its closed position.

FIG. 6 is a schematic perspective view of the electronic device of FIG. 4 showing the cover rotated open approximately 90° from its closed position.

WRITTEN DESCRIPTION OF PREFERRED EMBODIMENTS

Figure 7:
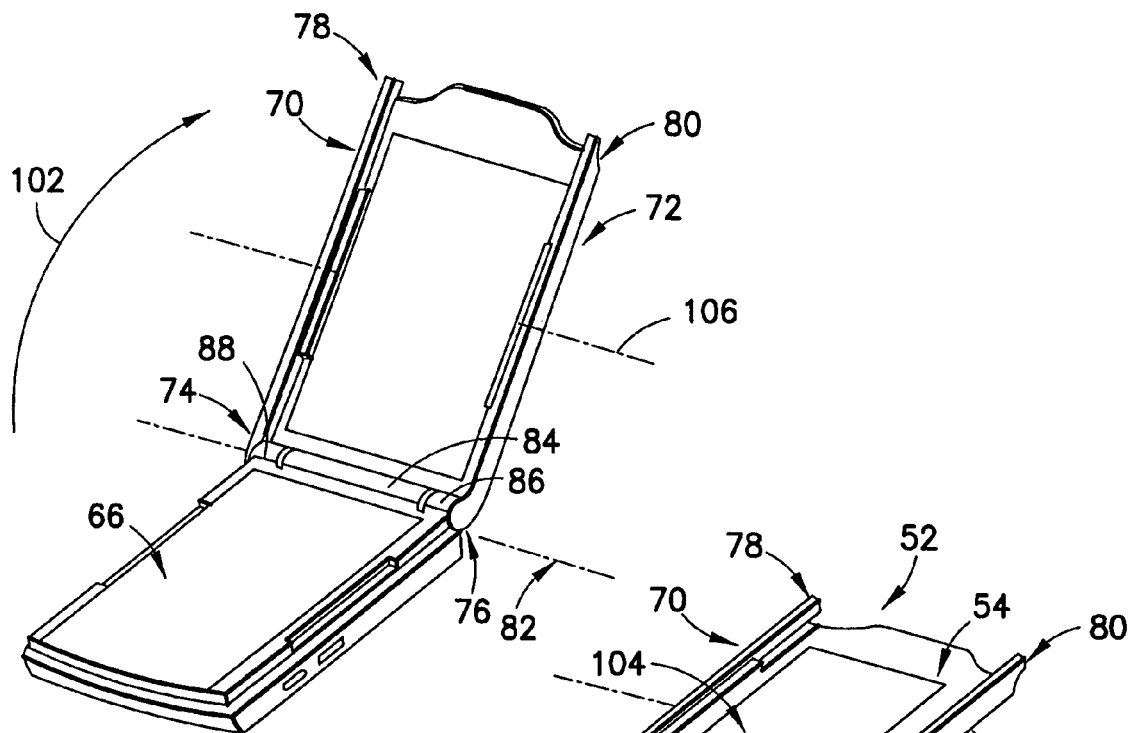
FIG. 7 is a schematic perspective view of the electronic device of FIG. 4 showing the cover rotated open greater than 90° from its closed position.
Figure 8:
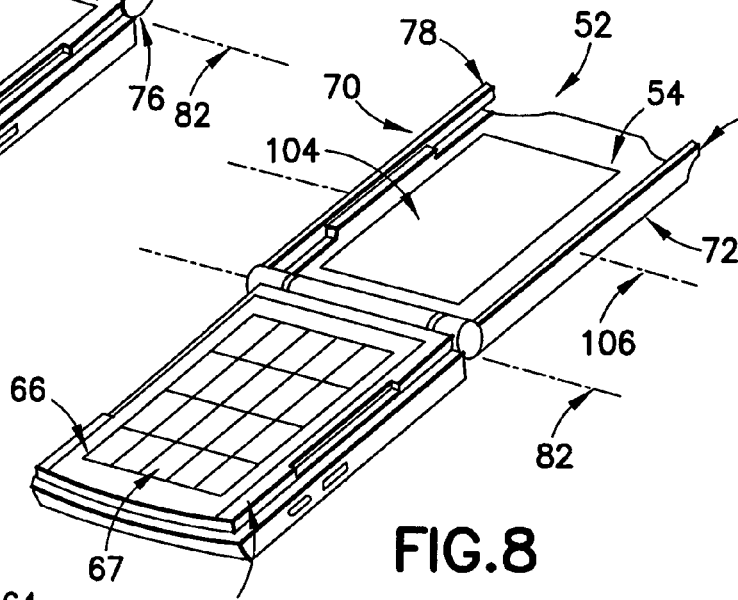
FIG. 8 is a schematic perspective view of the electronic device of FIG. 4 showing the cover rotated open 180° to reveal the display screen and keypad in one open operative position of the electronic device.
Figure 9:
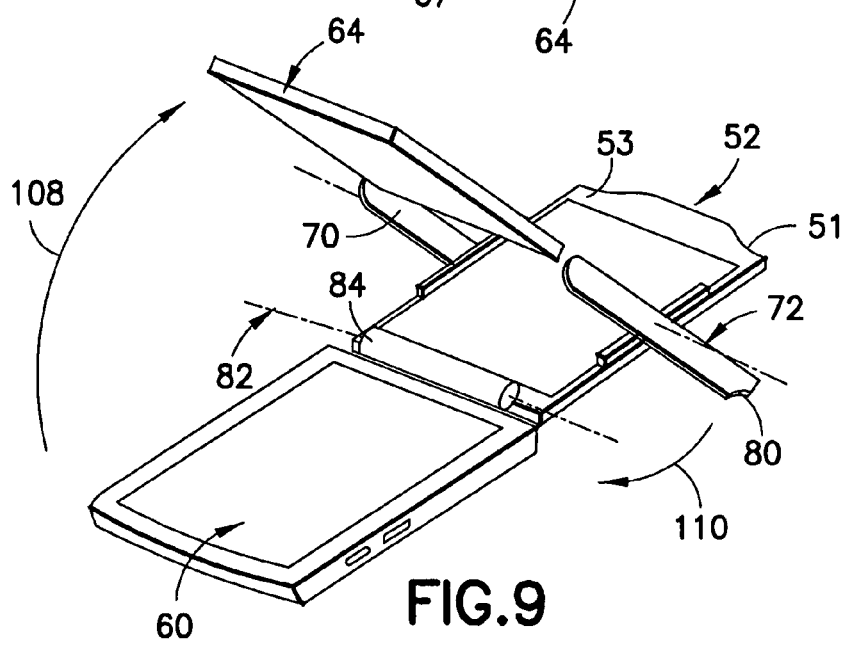
FIG. 9 is a schematic perspective view of the electronic device of FIG. 4 showing the pivot bars and body element carrying one portion of the function keyboard rotated open approximately 45° from the open operative position shown in FIG. 8 about the second pivot axis passing through the pivot bars.
Figure 10:
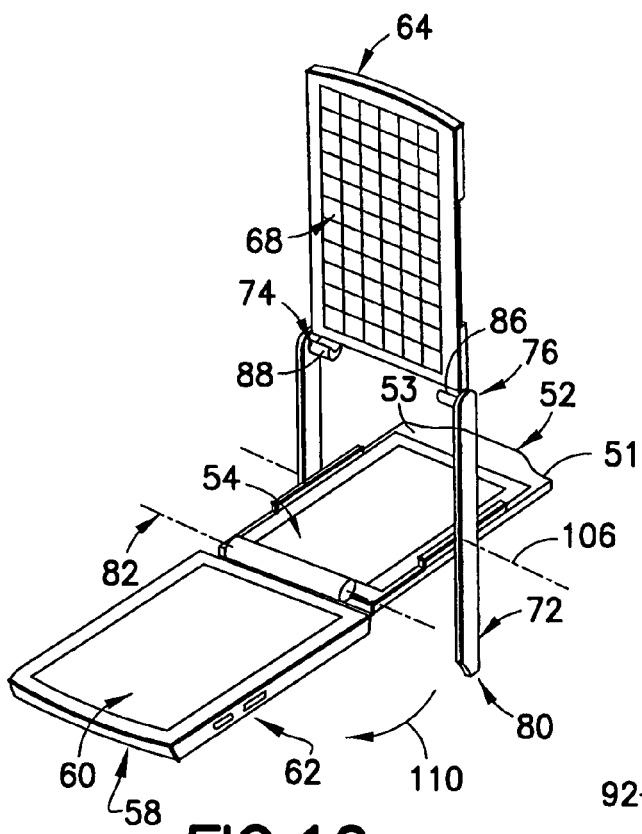
FIG. 10 is a schematic perspective view of the electronic device of FIG. 4 showing the pivot bars and body element carrying one portion of the function keyboard rotated open approximately 90° from the open operative position shown in FIG. 8.
Figure 11:
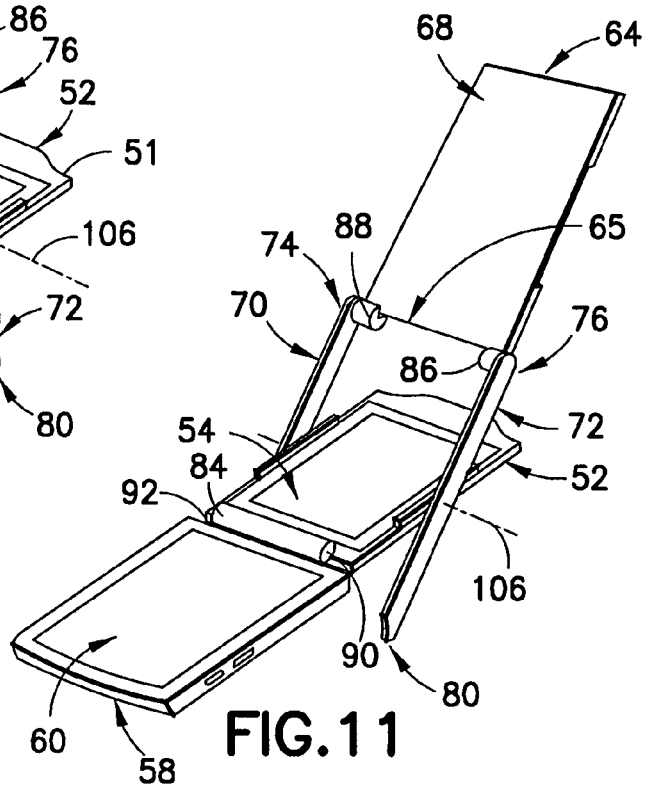
FIG. 11 is a schematic perspective view of the electronic device of FIG. 4 showing the pivot bars and body element rotated open approximately 120° from the open operative position shown in FIG. 8.
Figure 12:
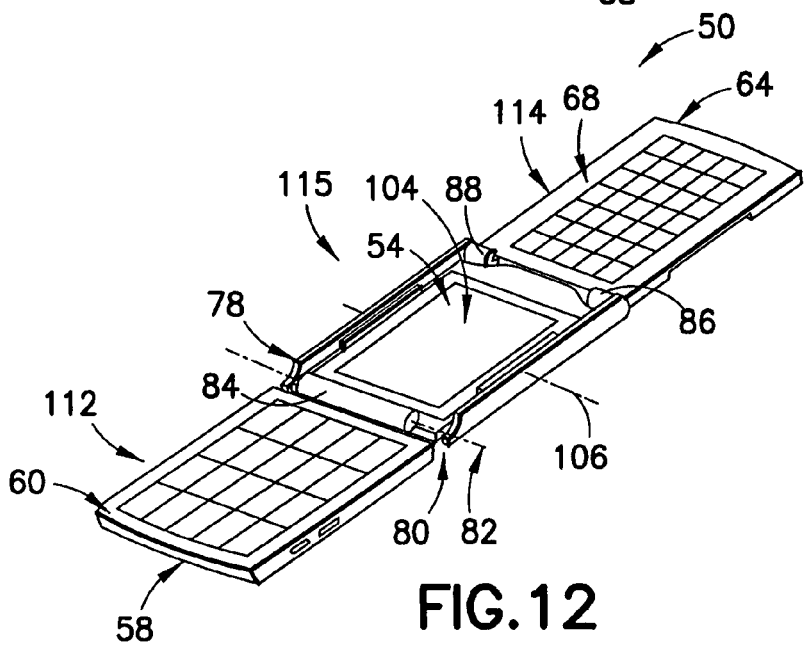
FIG. 12 is a schematic perspective view of the electronic device of FIG. 4 showing the pivot bars and body element carrying one portion of the function keyboard rotated open 180° from the open operative position shown in FIG. 8 to the messaging open position wherein the respective portions of the function keyboard are located at each side of the display screen and accessible for use.

Turning now to the drawings and considering FIGS. 4-15, a first embodiment of the present invention is illustrated therein. An electronic device generally designated 50 includes a first body element or cover 52 having a first major face surface 54 relative to usage and an oppositely disposed outer major face surface 56. The electronic device 50 is a foldable or hinged device and includes a second body element or base 58 having a second major face surface 60 relative to usage and an oppositely disposed base resting surface 62. A third body element or panel 64 is sandwiched between the cover 52 and the base 58 when the device 50 is in the closed position as illustrated in FIG. 4. The panel 64 includes a third major face surface 66 relative to usage when the device is in a first operative position as illustrated in FIG. 8, and has a fourth major face surface 68 relative to usage when the electronic device 50 is in a second operative position as illustrated in FIG. 12. The third major face surface 66 is oppositely disposed from the fourth major face surface 68.

Figure 13:
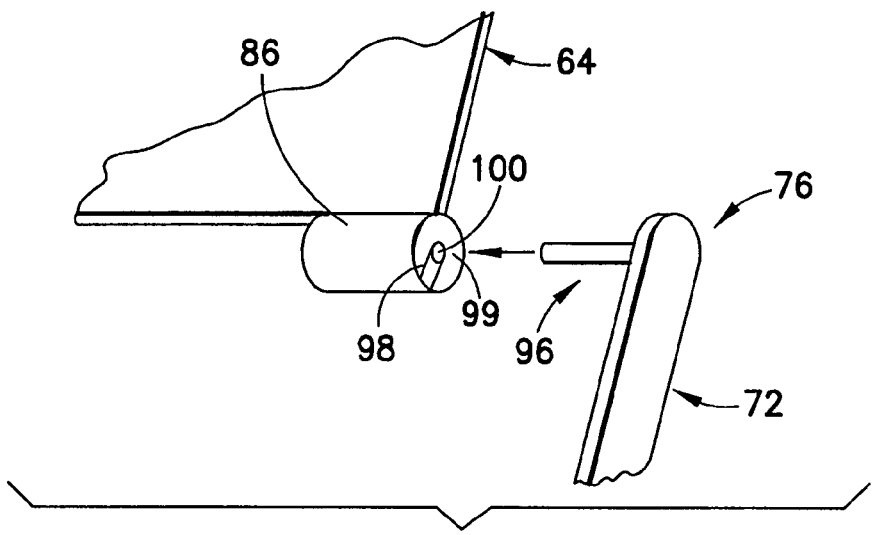
FIG. 13 is a schematic perspective fragmentary view of the hinged connection between amend of the pivot bar and one end of the body element carrying one portion of the function keyboard.

The cover 52 is nested between two pivot bars 70, 72 respectively along the marginal longitudinal side edges of the cover 52. The cover 52 is hingedly connected to the base 58 by means of a hinge member 84 such that the cover 52 is arranged for rotational movement with respect to the base 58 about the first pivot axis 82. The ends 74, 76 of the pivot bars 70, 72 are hingedly connected to the panel 64 via barrel like members 86, 88 located at respective corners at one end 65 of the panel 64. As illustrated in FIG. 13, the barrel 86 includes a bore 100 sized and shaped to receive a pin 96 extending transversely from the end 76 of the pivot bar 72 such that the pivot bar and cover 52 rotate together about the first pivot axis 82 when the cover 52 is rotated open from its closed position in a direction indicated by arrow 102 to its first open operative position as illustrated in FIG. 8. The barrel like members 86, 88 are sized and shaped to be received in complementary sized and shaped cheeks 90, 92 respectively at either side of the hinge member 84. An indent 98 in the outwardly facing surface 99 of the barrel like member 86 receives a similarly shaped bump or projection on the inwardly facing side of the pivot bar 72 such that the pivot bar 72 and panel 64 are releasably engaged to move with one another as described below. Although an indent is described for purposes of explanation any mechanism or method for releasably engaging the pivot arm to the panel 64, for example a spring-ball indent, designed to carry out the intended function is contemplated. A similar configuration and arrangement is used for the opposite side barrel like member 88 and pivot bar 70. It will be recognized and appreciated by those skilled in the art that the hinge member 84 may be of any suitable arrangement and configuration to carry out the intended function and therefore the hinge member 84 is described by way of example and does not preclude other hinge member configurations.

A screen 104 is constructed in the surface 54 of the cover 52 for displaying the graphics, text or other indicia consistent with the intended function to be carried out by the electronic device 50. An array of keys 67 consistent with the function to be carried out by the electronic device 50 is constructed in the third major face surface 66 of the panel 64 and for example may be a communication keypad. The screen 104 and keypad 67 may be of any suitable type and construction to carry out the intended function and are well known to those skilled in the art.

The electronic device 50 is placed in its second operative position by rotating the panel 64 in conjunction with the pivot bars 70, 72 about the second pivot axis 106 in the direction indicated by the arrow 108 causing the ends 78, 80 of the pivot bars 70, 72 respectively to move in the direction indicated by the arrow 110 and to expose the fourth major face surface 68 of the panel 64. As the panel 64 and pivot bars 70, 72 are further rotated about the second axis 106 to the fully open second operative position as indicated in FIG. 12, the pivot bars 70, 72 nest the cover 52 with the ends 78, 80 now at the hinge region of the base 58.

The barrel like members 86, 88 now are received and nest in complementary sized and shaped cheeks 51, 53 in the end of the cover 52 opposite the hinge end. As best illustrated in FIG. 12, the full function keyboard is divided in half and arranged on the left and right keyboard portions 112, 114. The left and right keyboard portions 112, 114 carry the key and button array 115 used for the particular application wherein the key and button array 115 is divided in half and arranged on the left and right keyboard portions 112, 114 respectively. The keys may be arranged in any desired configuration consistent with the intended function to be carried out by the electronic device and for example, the keys may be arranged as a QWERTY keyboard. The keyboard is designed for thumb actuation by both hands which makes it convenient to hold the electronic device 50 in both hands and operate the keyboard portions 112, 114 accurately and efficiently.

As best illustrated in FIG. 12, the left hand keyboard portion 112 is constructed in the second major face surface 60 of the base 58. The right-hand keyboard portion 114 is constructed in the fourth major face surface 68 of the panel 64. To ensure compact overlapping engagement of the base 58 and panel 64 in the electronic device closed position as illustrated in FIG. 4, the portions of the key array on the opposing face surfaces 60, 68 are offset to avoid interference or contact with one another and possible operation in the closed position. Alternately, the height or depth of the respective key arrays on the opposing faces 60, 68 are such that there is sufficient clearance when the base 58 and panel 64 are in the closed position. Further, the key arrays on the respective opposing faces 60, 68 may be disabled automatically or through user action when the electronic device is placed in the closed position.

Substantially, the entire surface area 54 of the cover 52 is available for the screen 104 to provide a substantially larger viewing area in both the operative position shown in FIG. 8 and the operative position shown in FIG. 12 compared to prior art foldable hinged electronic devices. The benefits of a larger screen display viewing area are apparent since additional information may be provided to the user without scrolling or jumping from screen-to-screen. A larger screen viewing area such as provided by the present invention is also beneficial to game playing or viewing website information such as that downloadable from the global computer network in a manner well known to those skilled in the art.

Figure 14A:
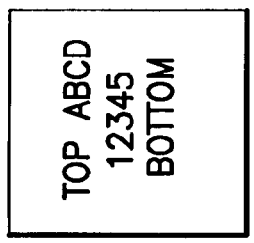
FIG. 14a is a schematic illustration of the display orientation in the device first operative open position.
Figure 14B:
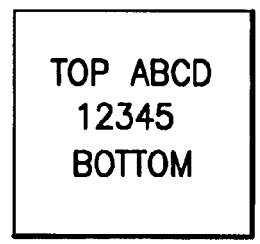
FIG. 14b is a schematic illustration of the display orientation in the device second operative open position.
Figure 15:
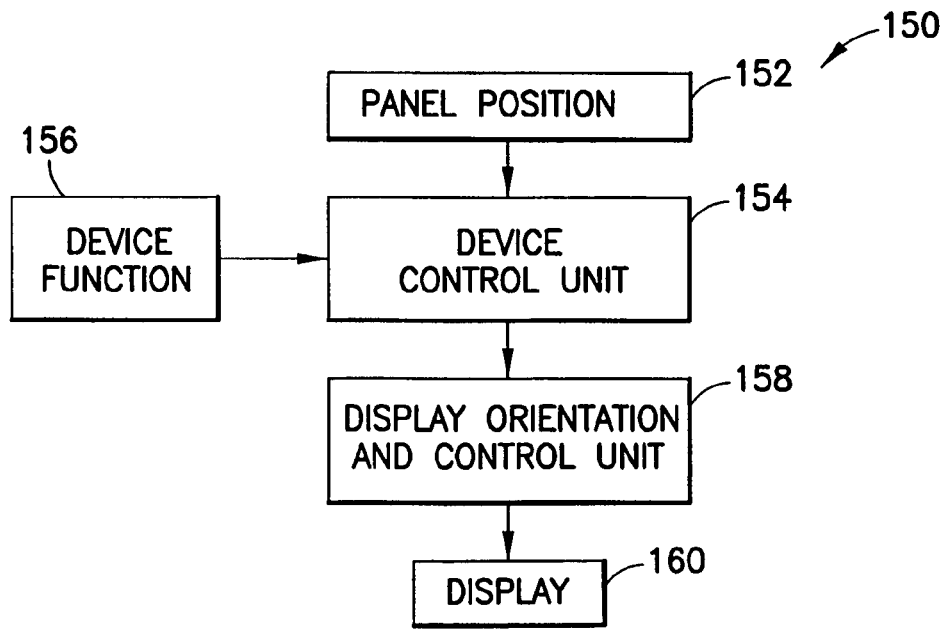
FIG. 15 is a block diagram of the control system of an electronic device embodying the present invention.

The display on the screen 104 is controlled for orientation in the two operative positions depending upon the mode of use. For example, in the profile operative mode position as shown in FIG. 8, the display is oriented in alignment with the keypad 67 and when in the fully open operative mode position as illustrated in FIG. 12, the display is aligned with the function key array 115. As illustrated in FIGS. 14A and 14B, the display orientation is rotated 90 degrees between the profile operative mode position in which the cover 52 is opened as illustrated in FIG. 8 to the fully open operative mode position wherein the cover 52 and base 58 are located at either side of the screen 104 and cover 52 in the electronic device as illustrated in FIG. 12. The orientation of the display and other operative functions of the electronic device are carried out by means of a system control unit 150 which is illustrated for example in the schematic functional block diagram of FIG. 15. A panel position indicator 152 provides a signal to the control device unit 154 in response to the cover 52 and/or panel 64 being in the electronic device first operative mode position as shown in FIG. 8 or second operative mode position as shown in FIG. 12. The device control unit 150 may be a microprocessor, digital signal processor, a display driver or other means including both the hardware and software for carrying out the control function as well as other intended and desirable functions and may contain a suitable memory for storing respective related computer programs to perform and control the intended functions as is well known by those skilled in the art and therefore not described in detail herein. The device control unit 150 may be manually operated by the user and which provides a device function 156 input by means of a key or other operative stimulus. The device function signal is coupled to the device control unit 154. The device control unit 150 provides an output signal corresponding to the desired orientation of the display to a display orientation and control unit 158 to orient the display 160 as needed. The device function 156 may optionally include a volume control function operable by means of one or more associated keys of the respective key arrays or by a suitable external volume control knob or button accessible by the user when the device is in the closed position for selectable adjustment of the volume. A volume control knob 162 may be suitably and conveniently located on the base 58 to allow the device to be used in the closed position, for example, to play music. Likewise, a power button 164 may be suitably and conveniently located on the base 58 to power the device on and off in the closed position to operate a desired intended function, for example, to operate as a music player.

Figure 16:
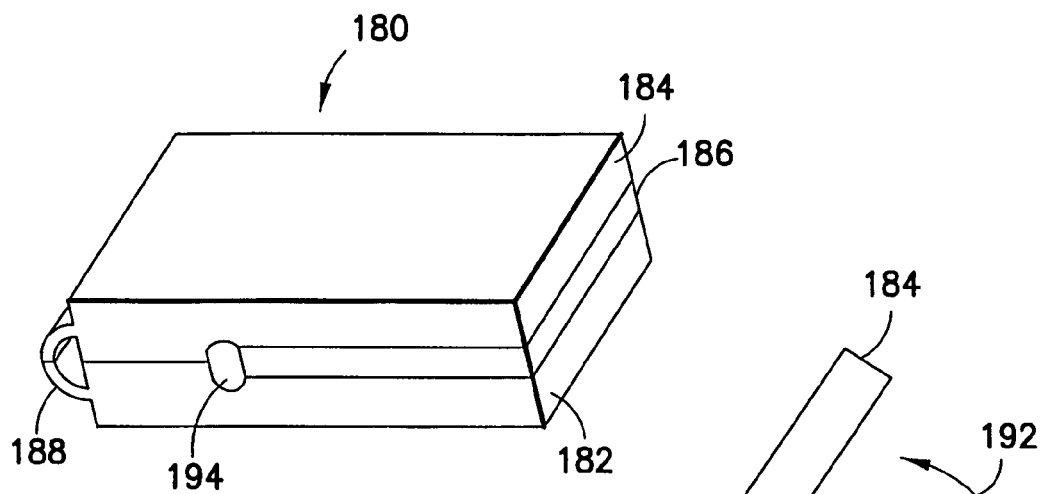
FIG. 16 is a schematic perspective view of an electronic device in its closed position in an alternate embodiment of the invention.
Figure 17:
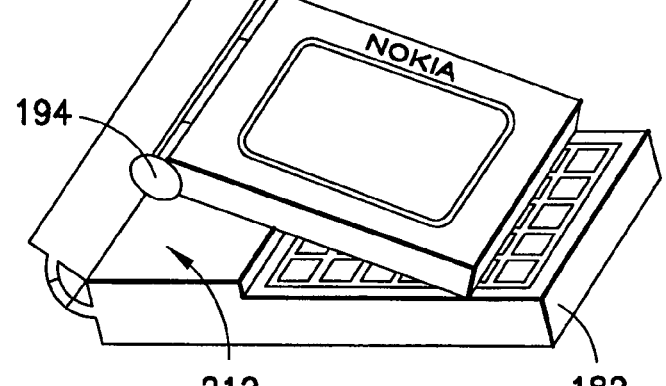
FIG. 17 is a schematic perspective view of the electronic device of FIG. 16 partially open to reveal the display screen and partially expose one portion of the function keyboard.
Figure 18:
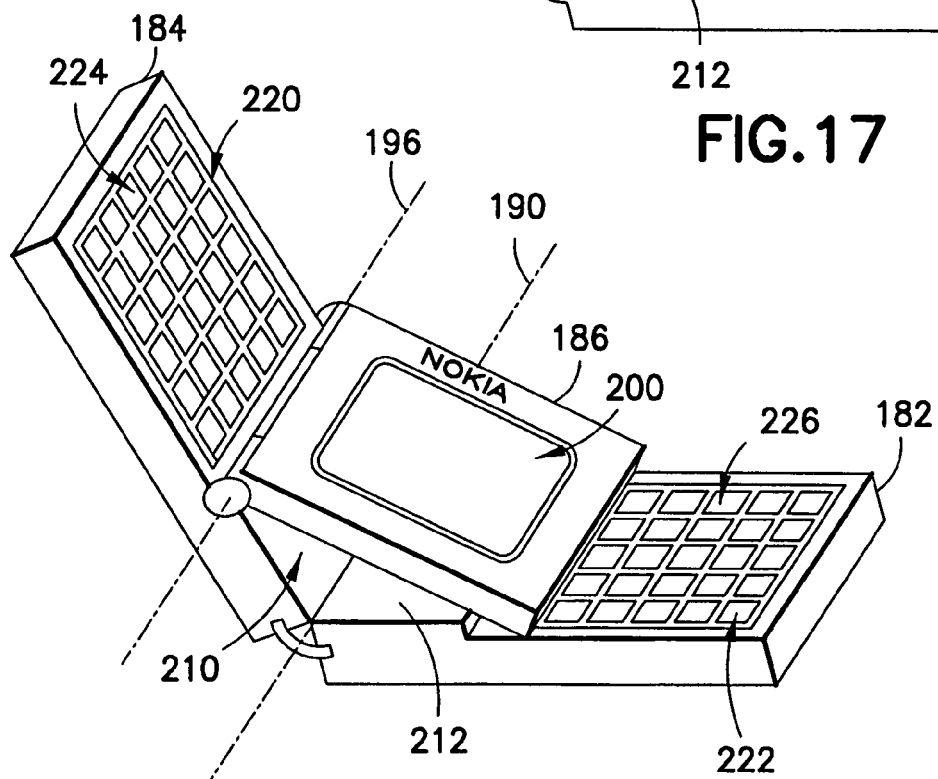
FIG. 18 is a schematic perspective view of the electronic device of FIG. 16 partially open to reveal the display screen and expose each portion of the function keyboard.
Figure 19:
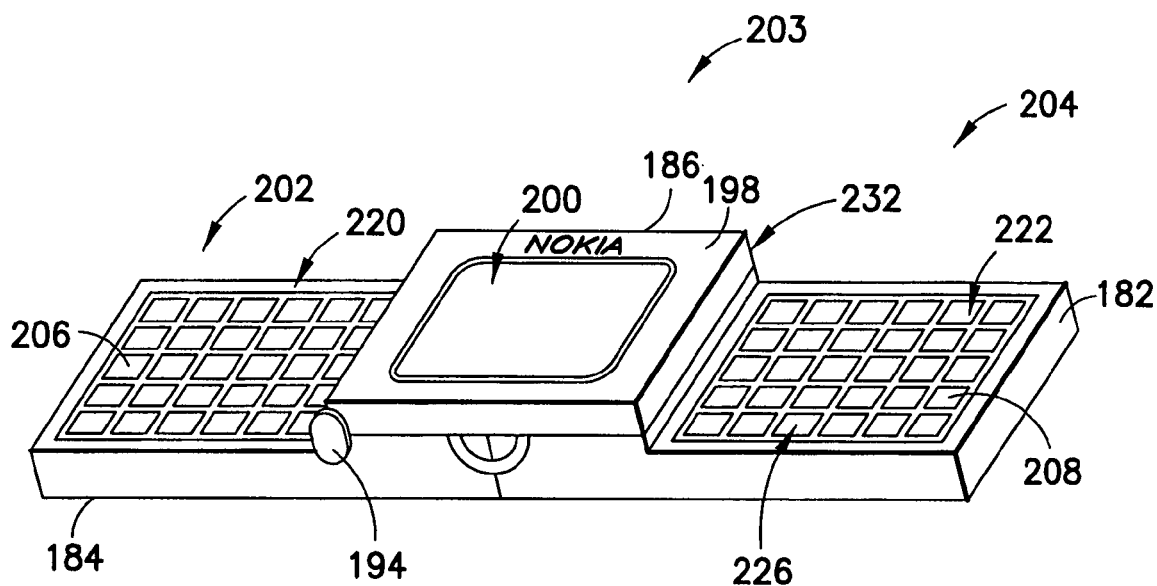
FIG. 19 is a schematic perspective view of the electronic device of FIG. 16 fully open showing the respective portions of the function keyboard located at each side of the display screen and accessible for use.
Figure 20:
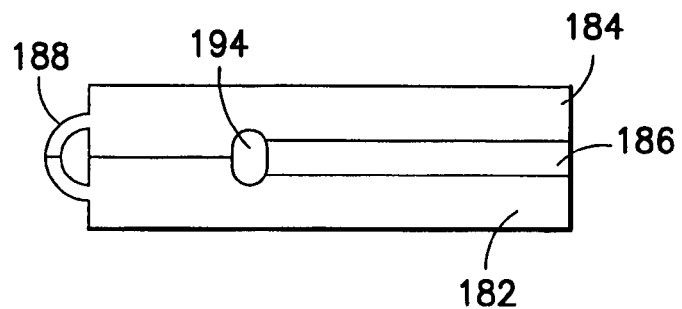
FIGS. 20-23 are schematic side elevation views of the electronic device of FIG. 16 corresponding to the positions of the electronic device shown in FIGS. 16-19, respectively.
Figure 21:
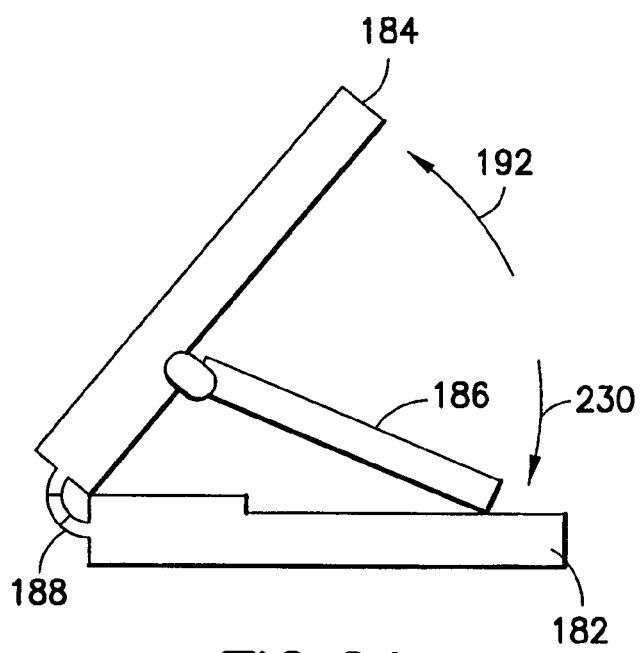
Figure 22:
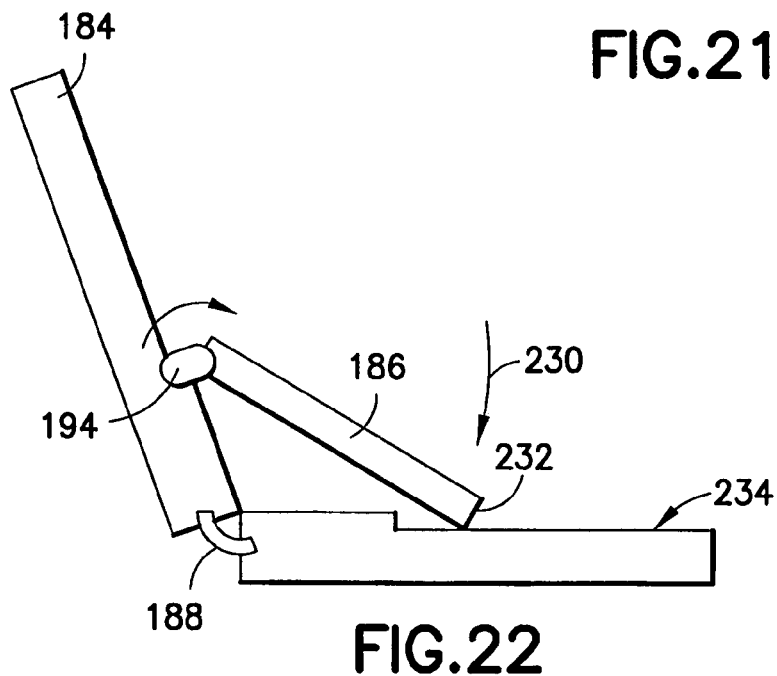
Figure 23:
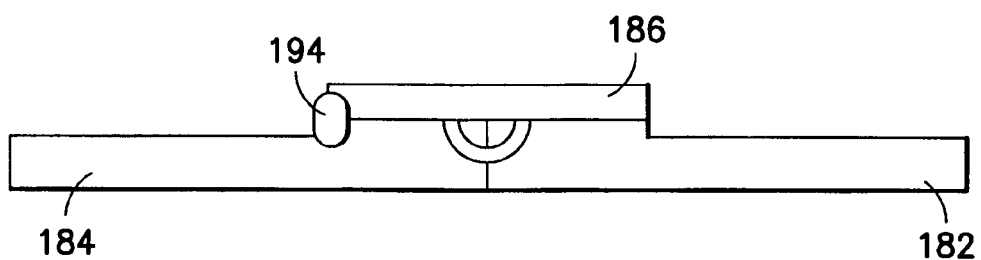

Turning now to FIGS. 16-23, an alternate embodiment of the electronic device embodying the present invention is illustrated therein and generally designated 180. The electronic device 180 includes a first body element or cover 184, a second body element or base 182 and a third body element or panel 186 sandwiched between the cover 184 and base 182 when the electronic device is in the closed folded position as illustrated in FIGS. 16 and 20. The cover 184 and base 182 are hingedly connected to one another by the hinge member 188 and arranged for pivotal movement with respect to one another when the cover 184 is rotated in a direction indicated by arrow 192 with respect to the base 182. When the electronic device 180 is moved to an open position as illustrated in FIG. 19, the cover 184 has a first surface 220 relative to usage and the base 182 has a second surface 222 relative to usage. The surface 220 of the cover 184 includes a hinge region 210 in the vicinity of the hinge member 188 and another portion of the surface 220 has an array of keys 224 constructed in the surface. The surface 222 of the base 182 has an arrangement of keys 226 constructed in a portion of the surface and a hinge region 212 in the vicinity of the hinge member 188. The hinge regions 210 and 212 are otherwise unused and wasted space. In accordance with the present invention, the panel 186 is hingedly connected to the cover 184 for pivotal movement with respect to the cover about a second pivot axis 196 when the cover 184 pivots about the first pivot axis 190 with respect to the base 182 to the open position as indicated by the direction arrow 192. Accordingly, the panel 186 pivots with respect to the cover 184 as the cover pivots with respect to the base 182. The panel 186 has a screen 200 constructed in the surface 198 for the visual display of information to the user when the electronic device 180 is in the open operative position mode as illustrated in FIGS. 19 and 23. The full function keyboard is divided in half and arranged on the left and right keyboard portions 202, 204. The left and right keyboard portions 202 and 204 carry the key and button array 203 used for the particular application wherein the key and button array 203 is divided in half and arranged on the left and right keyboard portions 202 and 204 respectively. The keyboard is designed for actuation by both hands which makes it convenient to hold the electronic device in both hands and operate the keyboard portions 202 and 204 accurately and efficiently. A portion of the keys 206 are constructed in the surface 220 of the cover 184 and the remaining portion of the keys 208 are constructed in the surface 226 of the base 182 to form the full function keyboard. The keys may be arranged in any desired configuration consistent with the intended function to be carried out by the electronic device and for example, the keys 206 and 208 may be arranged as a QWERTY keyboard. It should be noted that other key arrays can be used such as the French AZERTY or the German QWERTZ(U) keyboards.

The panel 186 is arranged to cover the otherwise unused hinge regions 210, 212 of the electronic device 180 to provide a compact arrangement while still providing for large viewing area on the screen 200. The hinge 194 which provides the pivotal arrangement between the panel 186 and the cover 184 may be a torque hinge which provides a downward bias of the end region 232 as indicated by the direction arrow 230 against the marginal edges 234 of the surface 226 as the cover 184 is pivoted opened and closed relative to the base 182. Alternately, the end region 232 may be arranged for slideable engagement with a slide track to retain the end region 232 in sliding engagement and in a spaced relation with the surface 226 of the base 182 to avoid dragging the panel over the key surfaces. Various arrangements and configurations may be utilized as well understood by those skilled in the art to carry out the intended function.

A full function keyboard and larger display screen size for an electronic device while maintaining the compact size demanded in an electronic device has been provided above in several preferred embodiments. It is believed that the many advantages of this invention will now be apparent to those skilled in the art. It will also be recognized and understood by those skilled in the art that a number of variations and modifications may be made to the electronic device without departing from the spirit and scope of the invention. Accordingly, the invention has been described by way of illustration rather than limitation.

The invention claimed is:

1. An electronic device, comprising:
a first body element having a first side that is oppositely disposed and parallel to a second side, and having a third side that is oppositely disposed and parallel to a fourth side, wherein said first and second sides are perpendicular to said third and fourth sides;
a second body element having a first side that is oppositely disposed and parallel to a second side, and having a third side that is oppositely disposed and parallel to a fourth side, wherein said first and second sides are perpendicular to said third and fourth sides;
a third body element having a first side that is oppositely disposed and parallel to a second side, and having a third side that is oppositely disposed and parallel to a fourth side, wherein said first and second sides are perpendicular to said third and fourth sides;
said first, second and third body elements being in an overlapping stacked alignment with one another when the device is in a closed position;
said first, second and third body elements being arranged in a continuous alignment with one another such that said first, second and third body elements form and define a substantially rectangular shaped configuration when the device is in an open position, wherein
said first side of said first body element, said first side of said second body element and said first side of said third body element further form and define a first side of said rectangular shaped configuration when the device is in said open position;
said second side of said first body element, said second side of said second body element and said second side of said third body element further form and define a second side of said rectangular shaped configuration when the device is in said open position, said second side of said rectangular shaped configuration being oppositely disposed and parallel to said first side of said rectangular shaped configuration;
said third side of said second body element further forms and defines a third side of said rectangular shaped configuration when the device is in said open position; and said fourth side of said third body element further forms and defines a fourth side of said rectangular shaped configuration when the device is in said open position;

a display screen constructed in at least one of said first, second and third body elements;

said first and second body elements arranged for pivotal movement with respect to one another about a first pivot axis;

said third body element arranged for pivotal movement with respect to one of said first and second body elements about a second pivot axis passing through said one of said first and second body elements, and a function keyboard constructed in two portions, each of said function keyboard portions having an array of keys consistent with a selected function wherein said function keyboard is exposed for operative use when the device is in a first open position, whereby said first, second and third body elements are in a non-overlapping alignment with one another and are located on opposite sides of said display screen.

2. The electronic device as defined in claim 1 further comprising said third body element having first and second major face surfaces oppositely disposed from one another, said first surface constructed with a keypad having an array of keys arranged consistent with a selected function whereby said keypad and said display screen are exposed for operative usage when the device is in a second open position.

3. The electronic device as defined in claim 2 further comprising a pair of spaced apart pivot bars wherein said first body element is nested between said spaced apart pivot bars, one end of each of said spaced apart pivot bars being attached to one end of said third body element for movement therewith, said second pivot axis passing through said pivot bars and said first body element whereby said third body element and said spaced apart pivot bars are arranged for pivotal movement with respect to said first and second body elements when said third body element is rotated between said second open position and said first open position.

4. The electronic device as defined in claim 3 wherein said screen display is constructed in said first body element, a first portion of said function keyboard constructed in said second body element and a second portion of said function keyboard constructed in said third body element.

5. The electronic device as defined in claim 4 wherein said function keyboard is a QWERTY keyboard and a first portion of the keys are carried by said second body element and the remaining keys are carried by said third body element.

6. The electronic device as defined in claim 2 wherein said screen display is constructed in said first body element.

7. The electronic device as defined in claim 6 further comprising a communication keypad.

8. The electronic device as defined in claim 7 further comprising a mobile terminal.

9. The electronic device as defined in claim 1 further comprising said display screen constructed in said third body element, a first portion of said function keyboard constructed in said second body element and a second portion of said function keyboard constructed in said first body element, one end of said third body element arranged for sliding linear movement with respect to one of said first and second body elements and the end opposite said one end arranged for pivotal movement about said second pivot axis with respect to the other of said first and second body elements when said first and second body elements are rotated about said first pivot axis between said closed position and said first open position.

10. The electronic device as defined in claim 9 further comprising a torque hinge for pivotally connecting said third body element to said other of said first and second body elements.

11. The electronic device as defined in claim 9 further comprising said one end of said third body element arranged for sliding linear movement in and along complementary slide rails located in the marginal side regions of said one of said first and second body elements whereby said one end is slidingly retained by grooves in said slide rails.

12. The electronic device as defined in claim 9 further comprising a hinge for hingedly connecting said first and second body elements together for relative pivotal movement about said first pivot axis whereby said display screen obscures the hinge when the device is in said first open position.

13. The electronic device as defined in claim 1 further comprising a power button for powering the electronic device on and off when the device is in a closed position.

14. The electronic device as defined in claim 1 further comprising a volume control button for selectable adjustment of the volume when the device is in a closed position.

15. Computer program carried on a storage medium and executable by a processor in an electronic device for automatically changing, if required, the orientation of information shown on a display of the electronic device when the electronic device is used in its first open operative position and in its second open operative position wherein the electronic device has a first body element having a first side that is oppositely disposed and parallel to a second side, and having a third side that is oppositely disposed and parallel to a fourth side, wherein said first and second sides are perpendicular to said third and fourth sides;

a second body element having a first side that is oppositely disposed and parallel to a second side, and having a third side that is oppositely disposed and parallel to a fourth side, wherein said first and second sides are perpendicular to said third and-fourth sides;

a third body element having first and second major face surfaces oppositely disposed from one another, said first major face surface constructed with a keypad having an array of keys arranged consistent with a selected function, and having a first side that is oppositely disposed and parallel to a second side, and having a third side that is oppositely disposed and parallel to a fourth side, wherein said first and second sides are perpendicular to said third and fourth sides;

said first, second and third body elements being arranged in an overlapping stacked alignment with one another when the device is in a closed position;

said first, second and third body elements being arranged in a continuous alignment with one another such that said first, second and third body elements t4e-inform and define a substantially rectangular shaped configuration when the device is in an open position, wherein said first side of said first body element, said first side of said second body element and said first side of said third body element further form and define a first side of said rectangular shaped configuration when the device is in said open position;

said second side of said first body element, said second side of said second body element and said second side of said third body element further form and define a second side of said rectangular shaped configuration when the device is in said open position, said second side of said rectangular shaped configuration being oppositely disposed and parallel to said first side of said rectangular shaped configuration;

said third side of said second body element further forms and defines a third side of said rectangular shaped configuration when the device is in said open position: and said fourth side of said third body element further forms and defines a fourth side of said rectangular shaped configuration when the device is in said open position;

a display screen constructed in at least one of said first, second and third body elements;

said first and second body elements further being arranged for pivotal movement with respect to one another about a first pivot axis;

said third body element further being arranged for pivotal movement with respect to one of said first and second body elements about a second pivot axis passing through said one of said first and second body elements;

a function keyboard constructed in two portions, each of said function keyboard portions having an array of keys consistent with a selected function wherein said function keyboard is exposed for operative use when the device is in a first open position, whereby said first, second and third body elements are in a non-overlapping alignment with one another and are located on opposite sides of said display screen, and whereby said keypad and said display screen are exposed for operative usage and said second and third body elements are in overlapping alignment with one another in a second open position.

16. An electronic device, comprising:

a first body element;

a second body element;

a third body element;

said first, second and third body elements being in an overlapping stacked alignment with one another when the device is in a closed position;

a display screen constructed in at least one of said first, second and third body elements;

said first and second body elements arranged for pivotal movement with respect to one another about a first pivot axis;

said third body element arranged for pivotal movement with respect to one of said first and second body elements about a second pivot axis passing through said one of said first and second body elements, said third body element having first and second major face surfaces oppositely disposed from one another, said first surface constructed with a keypad having an array of keys arranged consistent with a selected function whereby said keypad and said display screen are exposed for operative usage when the device is in a second open position, a function keyboard constructed in two portions, each of said function keyboard portions having an array of keys consistent with a selected function wherein said function keyboard is exposed for operative use when the device is in a first open position, whereby said first, second and third body elements are in a non-overlapping alignment with one another and are located on opposite sides of said display screen, and a pair of spaced apart pivot bars wherein said first body element is nested between said spaced apart pivot bars, one end of each of said spaced apart pivot bars being attached to one end of said third body element for movement therewith, said second pivot axis passing through said pivot bars and said first body element whereby said third body element and said spaced apart pivot bars are arranged for pivotal movement with respect to said first and second body elements when said third body element is rotated between said second open position and said first open position.

17. The electronic device as defined in claim 16 further comprising a communication keypad.

18. The electronic device as defined in claim 17 further comprising a mobile terminal.

19. The electronic device as defined in claim 16 wherein said screen display is constructed in said first body element, a first portion of said function keyboard constructed in said second body element and a second portion of said function keyboard constructed in said third body element.

20. The electronic device as defined in claim 19 wherein said function keyboard is a QWERTY keyboard and a first portion of the keys are carried by said second body element and the remaining keys are carried by said third body element.

* * * * *